United States Patent [19]

Kubens et al.

[11] 4,113,014
[45] Sep. 12, 1978

[54] PROCESS FOR REINFORCING GEOLOGICAL FORMATIONS

[75] Inventors: Rolf Kubens, Odenthal; Herbert Gebauer, Krefeld, both of Germany

[73] Assignee: Bayer Aktiengesellschaft, Leverkusen, Germany

[21] Appl. No.: 796,935

[22] Filed: May 16, 1977

[30] Foreign Application Priority Data

May 25, 1976 [DE] Fed. Rep. of Germany ....... 2623346

[51] Int. Cl.$^2$ .................... E21B 33/138; C08G 18/76; E02B 3/12
[52] U.S. Cl. .............................. 166/295; 260/18 TN; 260/75 NT; 528/67; 405/264
[58] Field of Search ................. 260/77.5 AT, 75 NT, 260/18 TN; 166/295; 61/36 C

[56] References Cited

U.S. PATENT DOCUMENTS

| | | | |
|---|---|---|---|
| 2,867,278 | 1/1959 | Mallory et al. | 166/295 |
| 3,362,979 | 1/1968 | Bentley | 260/75 NT |
| 3,397,542 | 8/1968 | Moulden | 61/36 C |
| 3,623,330 | 11/1971 | Nakade et al. | 61/36 C |
| 3,644,457 | 2/1972 | Koenig et al. | 260/77.5 AT |
| 3,692,813 | 9/1972 | Hagewann et al. | 260/77.5 AT |
| 3,805,531 | 4/1974 | Kistner | 166/295 |
| 3,882,684 | 5/1975 | Meyer et al. | 61/45 B |

*Primary Examiner*—H.S. Cockeram
*Attorney, Agent, or Firm*—Gene Harsh; Lawrence S. Pope; Frederick H. Colen

[57] ABSTRACT

The present invention relates to a process for the reinforcement of geological formations and loose rock and earth masses by introducing, into the cavities of the geological formations or rock or earth masses which are required to be reinforced, reaction mixtures based on organic polyhydroxyl compounds and organic polyisocyanates which react to form polyurethanes, which process is characterized in that the polyisocyanate component used is a polyisocyanate mixture containing from about 10 to 80%, by weight, of 2,4'-diisocyanato-diphenylmethane. The present invention also relates to a two-chamber cartridge suitable for carrying out the process according to the present invention. This cartridge comprises two chambers separated from each other, one containing a polyisocyanate component and the second chamber containing a polyol component, the quantitative proportions of the two components being calculated so that when the cartridge is destroyed, a reaction mixture which reacts to yield a polyurethane is obtained, characterized in that the polyisocyanate component used is a polyisocyanate mixture containing from about 10 to 80%, by weight, of 2,4'-isocyanato-diphenylmethane.

14 Claims, No Drawings

PROCESS FOR REINFORCING GEOLOGICAL FORMATIONS

BACKGROUND OF THE INVENTION

German Patent No. 1,129,894 (British Patent No. 885,762) describes a process for sealing and reinforcing geological formations against water or gas by means of polyurethanes, which process mainly consists in that the reactants which form a cross-linked product containing the group: —NH-CO-O, that is to say a diisocyanate or polyisocyanate and a polyol having at least three reactive OH groups, are mixed together in a liquid vehicle and the mixture is forced under pressure into the formation which is required to be sealed or reinforced.

The di- or poly-isocyanates recommended for this purpose are toluylene diisocyanate or prepolymers of toluylene diisocyanate and polyhydroxyl compounds, such as castor oil or hexane triol. These compounds have disadvantages as a result of which they are difficult or impossible to use below ground. Toluylene diisocyanate has a relatively high vapor pressure and the vapors are damaging to human mucous membranes, in particular those of the respiratory organs. Prepolymers of toluylene diisocyanate have a high viscosity and generally insufficient stability in storage. Almost without exception they must be processed together with liquid vehicles, such as solvents or plasticizers. These liquid vehicles lower the flashpoint of the mixtures and reduce the strength of the resulting polyurethanes.

To obviate the above-mentioned disadvantages of toluylene diisocyanate, it has become increasingly customary in recent years to produce polyurethane casting resins from polyisocyanates which, in addition to 4,4'-diisocyanatodiphenylmethane, contain mainly polyphenyl-polymethylenepolyisocyanates. These polyisocyanate mixtures, known in the international literature as "MDI," have the disadvantage, when used for reinforcing geological formations and loose rock and earth masses as mentioned, for example, in German Patent Application P 2,436,029.0 (German Auslegeschrift No. 2,436,029) and U.S. patent application Ser. No. 598,108, filed July 22, 1975 that they are incompatible with the conventional polyhydroxyl compounds, such as polyetherpolyols and castor oil (publication by Bayer AG "Baygal/Baymidur, Polyurethan-Giessharze," issued 1.11.1974, order no. KL 43006, page 15, column 1, last paragraph, according to which it is necessary to stir the MDI with the polyhydroxyl compound for three minutes, otherwise there is a risk of separation of the mixture into its components; see also G. Lottanti and K. Schiegg, Kunststoffe-Plastics Vol. 2, 1976, page 19, column 2, paragraph 3).

The customary method employed in the production of polyurethanes for overcoming the incompatibility of MDI with polyhydroxyl compounds by increasing the reactivity of the mixture by addition of catalyst, such as tertiary amines or metal compounds, cannot be used in the reinforcement of geological formations or loose rock and earth masses because once the polyisocyanate and polyhydroxyl compound have been mixed, there must still be a sufficient time available for the mixture to penetrate the cracks and pores of the formation before it solidifies or undergoes an unacceptable increase in viscosity. Even without the addition of the above-mentioned catalysts, polyisocyanatepolyol mixtures have in any case only a brief working life barely suufficient for reinforcing purposes (Stahl: Das Verfestigen des Kohlenbeins unterhalb der Kopfstracke in mannlosen Streben mit Polyurethanschäumen, Glückauf, 104, (1968), no. 15, page 667, left-hand column, fourth paragraph).

The second chemical method available for reducing the incompatibility of MDI with polyols, which consists of first preparing prepolymers, is also unsuitable for reinforcing purposes because the viscosity of prepolymers is too high.

It has now surprisingly been found that the problems of incompatibility which arise when "MDI" is used as polyisocyanate component for the reinforcement of geological formations may be overcome by using, as the polyisocyanate component, a mixture which contains from about 10 to 80%, by weight, of 2,4'-diisocyanato-diphenylmethane. This finding is quite unexpected since, on the one hand, it has hitherto been customary to overcome incompatibility by increasing the reactivity (addition of catalyst), as mentioned above, and, on the other hand, it is known that 2,4'-diisocyanato-diphenylmethane is less reactive towards polyhydroxyl compounds than the corresponding p,p'-isomer (German Auslegeschrift No. 1,923,214, column 5, lines 63 et seq.; the same teaching is given in British Patent No. 1,263,439).

SUMMARY OF THE INVENTION

The present invention, therefore, relates to a process for the reinforcement of geological formations and loose rock and earth masses by introducing, into the cavities of the geological formations or rock or earth masses which are required to be reinforced, reaction mixtures based on organic polyhydroxyl compounds and organic polyisocyanates which react to form polyurethanes, which process is characterized in that the polyisocyanate component used is a polyisocyanate mixture containing from about 10 to 80%, by weight, of 2,4'-diisocyanato-diphenylmethane.

The present invention also relates to a two-chamber cartridge suitable for carrying out the process according to the present invention. This cartrige consists of two chambers separated from each other, one chamber containing a polyisocyanate component and the second chamber containing a polyol component, the quantitative proportions of the two components being calculated so that when the cartridge is destroyed, a reaction mixture which reacts to yield a polyurethane is obtained, characterized in that the polyisocyanate component used is a polyisocyanate mixture containing from about 10 to 80%, by weight, of 2,4'-isocyanatodiphenylmethane.

DETAILED DESCRIPTION OF THE INVENTION

The polyisocyanate component which is essential to the present invention may be mixed with any of the conventional polyhydroxyl compounds and then introduced after an extremely short mixing time into the gaps, cavities and pores of the formations required to be reinforced. The mixtures have sufficient time to penetrate even the finest cavities and gaps and, when hardened, they provide very high mechanical strength and, in particular, the polyurethanes used for holding together disturbed geological formations are completely free from any signs of separation into their components. In addition, polyurethanes prepared from such polyisocyanates and used for reinforcing geological formations or loose rock and earth masses have the advantage of strongly adhering to coal and rock.

The polyisocyanate component which is an essential feature of the present invention consists of polyisocyanate mixtures containing from about 10 to 80%, by weight, preferably from about 15 to 60% by weight most preferably from about 25 to 60% by weight of 2,4'-diisocyanato-diphenylmethane. In addition to this 2,4'-isomer, the polyisocyanate component which is essential to the present invention generally contains other isomeric or homologous polyisocyanates of the diphenylmethane series. This means that these essential polyiisocyanate components are generally either mixtures of about 10 to 80%, by weight, preferably form about 15 to 60% by weight and most preferably from about 25 to 60% by weight of 2,4'-diisocyanato-diphenylmethane with about 20 to 90% by weight preferably with about 40 to 85% by weight and most preferably with about 40 to 75% by weight of 4,4'-diisocyanato-diphenylmethane and optionally from about 0 to 20% by weight of 2,2'-diisocyanato-diphenylmethane, based on the total quantity of polyisocyanate mixture, or mixtures of these isomers with tri-and higher nuclear polyphenyl-polymethylenepolyisocyanates. The last-mentioned polyisocyanate mixtures generally contain from about 10 to 60%, by weight, of such higher nuclear polyisocyanates, based on the total quantity of polyisocyanate mixture. However, the polyisocyanate mixtures always contain an amount of 2,4'-diisocyanato-diphenylmethane which is within the limits mentioned hereinbefore. The first mentioned mixture suitable for use as polyisocyanate component according to the present invention may be obtained, for example, by removal by distillation of a diisocyanate mixture having the composition indicated above from a polyisocyanate mixture obtained by the phosgenation of aniline/formaldehyde condensates. The mixture containing higher nuclear polyisocyanates, which is also suitable for the process according to the present invention, may be obtained, for example, by returning the last-mentioned distillation product to a phosgenation product which has been depleted of 4,4'-diisocyanato-diphenylmethane, for example in accordance with German Auslegeschrift No. 1,923,214 which corresponds to British Pattent No. 1263439. A mixture of this type, i.e., a polyisocyanate mixture containing an amount of 2,4'-diisocyanato-diphenylmethane within the limits according to the present invention, may be obtained directly by a suitably controlling the anilineformaldehyde condensation reaction. U.S. Pat. No. 3,277,173, for example, describes a method of obtaining polyamine mixtures of the diphenylmethane series which contain a high proportion of 2,4'-diamino-diphenylmethane. Polyisocyanates suitable for the purpose of the present invention may be obtained directly by phosgenating these condensates which are rich in 2,4'-diamino-diphenylmethane. Methods of obtaining such polyisocyanate mixtures are also indicated in German Offenlegungsschrift No. 1,937,685 and in U.S. Pat. No. 3,362,979. The polyisocyanate mixtures comprising tri- and higher nuclear polyphenyl-polymethylene-polyisocyanates which are suitable for the process of the present invention as well as the diisocyanate mixtures which are suitable for the process of the present invention and which are free from such higher nuclear polyisocyanates exhibit a visosity at 25° C within the range of about 10 to 150 mPas. It is also possible, in principle, but not preferred, to use mixtures of MDI fractions which are rich in 2,4'-diisocyanato-diphenylmethane with other polyisocyanates, such as toluylene-diisocyanates.

Suitable polyol components for the process according to the present invention are mainly those suitable for the production of polyurethanes used for other purposes, e.g. polyesters containing OH groups, polyethers containing OH groups, polyhydric alcohols and castor oil. Particularly suitable are hydroxyl polyethers having OH numbers of from about 50 to 600 prepared from polyhydric alcohols or amines, such as glycerol, trimethylolpropane, ethyleneglycol, propyleneglycol, ethylenediamine and alkylene oxides, such as ethylene oxide and propylene oxide and mixtures thereof, as well as castor oil. Suitable polyhydroxypolyesters which may be used but which are less preferred than said polyetherpolyols or castor oil have OH numbers of from about 50 to 600 and are prepared in known manner by condensing preferably dibasic acids or their anhydrides such as adipic acid phthalic acid, or phthalic acid anhydride with di- or trivalent alcohols such as ethylene glycol, tetramethylene glycol, hexamethylene glycol, glycerol or trimethylol propane.

The proportions in which the polyol component is mixed with the isocyanate may vary within wide limits, but it is preferred to use sufficient isocyanate to provide from about 0.5 to 2, preferably from about 0.7 to 1.5 isocyanate groups to one OH group. If the geological formations and loose rock and earth masses which are required to be reinforced have a high moisture content, it is suitable to use a larger excess of isocyanate.

The conventional additives of polyurethane chemistry may be used for modifying the polyurethanes obtained, e.g. blowing agents, such as water and fluorinated hydrocarbons, accelerators, such as tertiary amines, metal catalysts and foam regulators, such as organo-silicon compounds.

Water-binding substances, such as sodium aluminosilicate of the zeolite type may also be added to prevent foaming of the reinforcing substance, if desired.

These additives are generally added to the polyol component.

When carrying out the process according to the present invention, the reaction mixture which reacts to form the polyurethane is preferably introduced into previously produced bore holes which are preferably sealed after introduction of the reaction mixture and before the chemical reaction sets in to any significant extent. Sealing of the bore holes is particularly to be recommended if the reaction mixture is liable to foam due to the addition of water or the presence of water in the geological formation or the additon of organic blowing agents.

The reaction mixture used for the present invention, which reacts to form polyurethanes, may be introduced by various methods into the geological formation or into the bore hole. For example, the reaction mixture may first be prepared by mixing the components outside the geological formation and it may then be introduced into the formation before the reaction sets in. Alternatively, the polyisocyanate component and polyol component may be introduced into the bore hole from separate containers by means of pumps or gas pressure and mixing of the two products may be carried out, for example, in a continuousflow mixer arranged in front of or inside the bore hole.

One particularly interesting method of carrying out the process according to the present invention is based on the principle outlined in U.S. Pat. No. 3,698,196, according to which a two-chamber cartridge is used, consisting of two separate containers, one containing the polyisocyanate component and the other the polyol component. The quantities of the two components are calculated so that when the two components come together as a result of destruction of the cartridge they form a reaction mixture which reacts to yield a polyurethane. When the process according to the present invention is carried out using such cartridges, the cartridges are introduced into the previously prepared bore hole and then mechanically destroyed in the bore hole to enable the two components to mix. In this embodiment of the present invention, it is found to be particularly advantageous if the two components are readily compatible with each other since vigorous stirring of the two components after destruction of the cartridge is hardly possible.

The advantages of the process according to the present invention will be illustrated with the aid of the following Examples, in which the various compounds named have the following compositions:

Isocyanate (1)

A polyisocyanate consisting of 60%, by weight, of 2,4'-diisocyanato-diphenylmethane and 40%, by weight, of 4,4'-diisocyanato-diphenylmethane. NCO-content: 32.8%, viscosity: 13 mPa at 25° C.

Isocyanate (2)

A polyisocyanate consisting of 30%, by weight, of 2,4'-diisocyanato-diphenylmethane, 43%, by weight, of 4,4'-diisocyanato-diphenylmethane, 11%, by weight, of di(isocyanatophenyl-methyl-)isocyanatobenzene and 16%, by weight, of higher nuclear polyphenyl-polymethylene polyisocyanates. NCO-content: 32.0%, viscosity: 72 mPa at 25° C.

Isocyanate (3) A polyisocyanate consisting of 3%, by weight, of 2,4'-diisocyanato-diphenylmethane, 54%, by weight, of 4,4'-diisocyanatodiphenylmethane, 24%, by weight, of di-(isocyanatophenyl-methyl)-isocyanato-benzene and 19%, by weight, of higher nuclear polyphenyl-polymethylene-polyisocyanates. NCO-content: 31.8%, viscosity: 75 mPa at 25° C.

Polyol (1)

A polyetherpolyol prepared from trimethylolpropane and propylene oxide and having an OH number of 370, an average molecular weight of 450 and a viscosity of 700 mPa at 25° C.

Polyol (2)

A polyetherpolyol prepared from glycerol and propylene oxide and having an OH number of 410, an average molecular weight of 480 and a viscosity of 620 mPa at 25° C.

Polyol (3)

Castor oil, a natural product available commercially, quality grade first distillation cut, having an OH number of 148 and a viscosity of 930 mPa at 25° C.

Polyol (4)

A polyetherpolyol prepared from ethylene diamine and propylene oxide and having an OH number of 61, an average molecular weight of 3500 and a viscosity of 630 mPa at 25° C.

EXAMPLES

EXAMPLE 1

The apparatus used for rock reinforcement was the mixing and dosing device designed for processing two-component plastics and comprising the following main parts:

(A) 2 steel storage tanks, each having a capacity of 30 liters. The tanks were designed to be sealed and could be charged with pressurized gas for producing a preliminary pressure.

(B) 2 piston dosing pumps, provided with a common pneumatic drive, by means of which the material stored under pressure in the storage tanks is removed from them in a volumetric ratio of about 1:1 and fed to the continuous-flow mixer (C).

(C) The continuous-flow mixer constructed as a static mixer and consisting of a steel pipe having a length of 70 cm, an external diameter of 9.5 mm and an internal diameter of 8.1 mm and 54 baffle plates installed inside the pipe and uniformly distributed along its length.

The mixing and dosing installation operated at an output of two liters of mixture per minute. One of the two storage tanks (A) remained charged for the whole operating period with polyol (1) to which 5%, by weight, of finely dispersed sodium aluminosilicate of the zeolite type had been added with vigorous stirring.

The second of the two tanks was filled with isocyanate (1) in the case of embodiment 1, isocyanate (2) in embodiment 2 and isocyanate (3) in embodiment 3.

The material which was required to be reinforced was a 20 cm high pile of loose gravel having a particle size of from 5 to 40 mm. To solidify this pile, the outlet aperture of the continuous flow mixer was held directly over the uppermost layer of gravel so that the polyisocyanate/polyol mixture filled the cavities between the particles from the top downwards.

The result was assessed 5 hours after the mixing and dosing installation was switched off. In embodiments 1 and 2, the reinforcing material was homogeneous and firm throughout. In embodiment 3, both the uppermost and the lowermost layers of reinforcing material were soft. Slight finger pressure was enough to loosen the pebbles from the bond whereas in embodiments 1 and 2 it was impossible to detach the stones from the bond even with great effort.

EXAMPLE 2

A mixing and dosing installation comprising the following main parts was used:

(A) 2 storage tanks as in Example 1;

(B) 2 gearwheeled dosing pumps, each equipped with an electric drive. The ratio in which the components were dosed could be adjusted as desired by means of an infinitely variable mechanical transmission.

(C) Continuous-flow mixer consisting of a cylindrical mixing chamber having a length of 37 mm and a diameter of 16 mm. An electrically-driven finger-blade stirrer 36 mm in length fitted with 6 stirrer blades each 3 mm in width and 14 mm in length were arranged in the axis of the cylinder.

The mixing and dosing installation was adjusted to a mixing ratio of 1 part, by volume, of polyisocyanate component to 1.2 parts, by volume, of polyol component. The stirrer speed was 9000 revs. per min., the output 1 liter per min.

The polyol component introduced into the storage tank (A) was a mixture of 100 parts, by weight, of polyol (2), 20 parts, by weight, of polyol (3) and 10 parts, by weight, of a 50% paste of sodium aluminosilicate of the zeolite type in castor oil.

Isocyanates (1) to (3) were used successively as polyisocyanate component.

To assess the power of adherence of the reactive polyisocyanate/polyol mixtures to carbon and rock, prisms of coal and prisms of shale measuring 4 × 4 × 16 cm were broken up and the fragments fixed in a mold with a distance of 2 mm between the fracture surfaces and the polyisocyanate/polyol mixture was poured over them from the mouthpiece of the mixing chamber. After a hardening time of 8 hours, the flexural strength of the bonded prisms was determined according to DIN 53 452 and used as a measure of the bond strength. The results obtained are shown in the following Table:

|  | Bond Strength on Coal | Bond Strength on Rock |
| --- | --- | --- |
| Isocyanate (1) | 1.24 mPa | 3.10 mPa |
| Isocyanate (2) | 0.98 | 2.85 |
| Isocyanate (3) | 0.31 | 0.96 |

EXAMPLE 3

A polyol mixture was prepared by mixing 100 parts, by weight, of polyol (1), 25 parts, by weight, of polyol (4) and 1.2 parts, by weight, of water. 100 g. of this polyol mixture were mixed with 100 g. of isocyanate (1 ) in a plastic cup for 25 seconds, using an electrically-driven stirrer having a stirrer blade 6 cm in length and 2 cm in width and rotating at the rate of 200 revs. per min.

The mixture was poured into a downwardly-sloping bore hole 2 cm in diameter and 50 cm in depth which had previously been drilled through loose shale by means of a stone drill. The bore hole was sealed with a rubber plug immediately after it had been filled.

After 15 hours, the shale was broken up with a pick-axe. It was found that, starting from the bore-hole, the polyurethane foam had penetrated cracks in the rock over a distance of several centimeters and firmly bonded and reinforced the rock. Visual inspection and contact with the tip of a steel needle revealed no nonhomogeneous areas within the polyurethane.

When the experiment was repeated, but using an equal quantity of isocyanate (3) instead of isocyanate (1), the polyurethane foam was found to have a lower bond strength, and soft areas which had failed to harden completely due to separation of the components were observed.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Process for reinforcing geological formations and loose rock and earth masses comprising introducing into the cavities of the geological formations or masses of rock and earth which are required to be reinforced reaction mixtures based on organic polyhydroxyl compounds and organic polyisocyanates which react to yield polyurethanes, characterized in that the polyisocyanate component used is a polyisocyanate mixture containing from about 10 to 80%, by weight, of 2,4'-diisocyanato-diphenylmethane.

2. Process according to claim 1, characterized in that the mixture which reacts to yield polyurethanes is introduced into previously prepared bore holes.

3. Process according to claim 2, characterized in that the polyisocyanate and polyol are delivered to the bore hole from separate containers by means of pumps or gas pressure, the two products being mixed in a continuous-flow mixer positioned in front of or inside the bore hole.

4. Process for reinforcing geological formations and loose rock and earth masses comprising introducing a two-chamber cartridge into a previously prepared bore hole, one chamber of the cartridge containing a polyol component and a second chamber containing a polyisocyanate component, and destroying the cartridge inside the bore hole to obtain a reaction mixture which reacts to form a polyurethane, characterized in that the polyisocyanate component used is a polyisocyanate mixture containing from about 10 to 80%, by weight, of 2,4'-diisocyanatodiphenylmethane.

5. A two-chamber cartridge for carrying out the process according to claim 4, comprising two chambers separated from each other, one chamber containing a polyisocyanate component and the second chamber containing a polyol component, the proportions of the two components being calculated so that when the cartridge is destroyed, a mixture which reacts to yield a polyurethane is obtained, characterized in that the polyisocyanate component used is a polyisocyanate mixture containing from about 10 to 80%, by weight, of 2,4'-diisocyanato-diphenylmethane.

6. A process for reinforcing geological formations and loose rock and earth masses comprising introducing an at least two-component reactive mixture into the material to be reinforced wherein said at least two-component reactive mixture comprises
   (a) an organic polyhydroxyl compound and
   (b) an organic polyisocyanate mixture comprising from about 10 to 80%, by weight, of 2,4'-diisocyanato-diphenylmethane.

7. The process of claim 6 wherein the organic polyisocyanate mixture comprises
   (i) from about 10 to 80%, by weight, of 2,4'-diisocyanato-diphenylmethane,
   (ii) from about 20 to 90%, by weight, of 4,4'-diisocyanato-diphenylmethane, and
   (iii) about 0 to 20%, by weight, of 2,2'-diisocyanato-diphenylmethane.

8. The process of claim 7 wherein the organic polyisocyanate mixture additionally comprises from about 10 to 60%, by weight, of tri-and higher nuclear polyphenyl-polymethylene-polyisocyanates.

9. The process of claim 6 wherein the organic polyhydroxyl compound is selected from the group consisting of polyesters, polyethers, polyhydric alcohols and castor oil.

10. The process of claim 9 wherein the organic polyhydroxyl compound is a polyether having an OH number of from about 50 to 600.

11. The process of claim 6 wherein the ratio of NCO groups to OH groups is from about 0.5:1 to 2:1.

12. A process for reinforcing geological formations and loose rock and earth masses comprising
   (a) introducing a two-chamber cartridge into a previously prepared bore hole wherein
      (i) one chamber of said cartridge contains an organic polyhydroxyl compound, and
      (ii) the second chamber of said cartridge contains an organic polyisocyanate mixture comprising from about 10 to 80%, by weight, of 2,4'-diisocyanato-diphenylmethane; and (b) destroying said cartridge inside the bore hole to obtain a reaction mixture which reacts to form a polyurethane.

13. The process of claim 12 wherein the organic polyisocyanate mixture comprises
   (i) from about 10 to 80%, by weight, of 2,4'-diisocyanato-diphenylmethane,
   (ii) from about 20 to 90%, by weight, of 4,4'-diisocyanato-diphenylmethane and
   (iii) from about 0 to 20%, by weight, of 2,2'-diisocyanato-diphenylmethane.

14. The process of claim 13 wherein the organic polyisocyanate mixture additionally comprises from about 10 to 60%, by weight, of tri-and higher nuclear polyphenyl-polymethylene-polyisocyanates.

* * * * *